Oct. 23, 1951 J. D. FUNDERBURG ET AL 2,572,130

HIGH-FREQUENCY TUNING DEVICE

Filed Dec. 1, 1949

INVENTORS
JOE D. FUNDERBURG
BURTON P. HEINMILLER
BY Herbert E. Metcalf
Attorney

Patented Oct. 23, 1951

2,572,130

UNITED STATES PATENT OFFICE 2,572,130

HIGH-FREQUENCY TUNING DEVICE

Joe D. Funderburg, Los Angeles, and Burton P. Heinmiller, Glendale, Calif., assignors to Gille Bros., Hollywood, Calif., a firm Application December 1, 1949, Serial No. 130,536

2 Claims. (Cl. 178—44)

The present invention relates to tuned circuits and, more particularly, to small, compact and light weight L. C. circuits that are ideally adapted for use in the higher megacycle band radio, radar, or television circuits.

It is customary in high frequency circuits to couple a small variable capacity with a small fixed loop to obtain a tuned circuit. In most instances the loop is not tunable so that for differing frequencies the Q of the circuit may not be optimum. Furthermore, the extension of the loop beyond the variable capacity increases the over-all size of the unit.

It is an object of the present invention to provide an L. C. circuit adapted particularly for high frequency use having both the capacity and inductance variable. It is another object of this invention to provide an L. C. circuit of minimum space requirements and of wide tuning range.

In broad terms, the invention comprises a variable capacity, preferably of the interleafed vane type, surrounded by an open ended conducting tube oppositely and partially slotted, with the portions of the tube separated by the slots connected to the capacity terminals. Thus, the path around the slots constitutes the inductance. In case the inductance is to be made variable, the tube is provided with a shorting ring slidable along the slots to effectively change the extent of the slots, thus providing inductance tuning.

Other objects and advantages of the present invention will be apparent from a description of the attached drawings which show a preferred form of the invention as suitable for use in the 225-400 megacycle band of frequencies.

Figure 1:
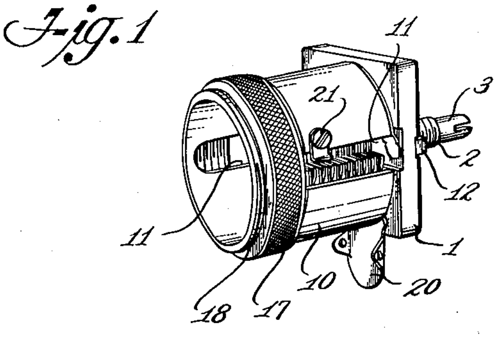
Figure 1 is a perspective view of a tuned circuit unit embodying the present invention.
Figure 3:
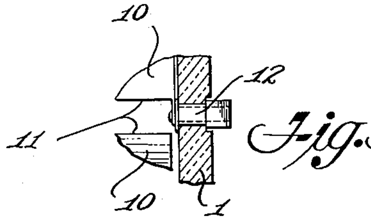
Figure 3 is a fragmentary view partly in section and partly in elevation of the base connection of one side of the inductance shown in Figure 1.
Figure 2:
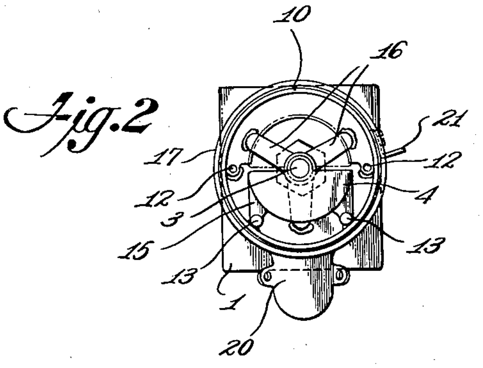
Figure 2 is an end view in elevation of the unit of Figure 1.

Referring to the drawings, a base 1 of high dielectric, low-loss material such as styrene, for example, is provided with a central bearing 2 in which a shaft 3 is rotatable. Shaft 3 is provided with the usual spaced semicircular condenser rotor plates 4.

The inductance is provided by open ended tube 10 surrounding rotor plates 4. Tube 10 is longitudinally slotted, and opposite slots 11 extend from the base end of tube 10 to terminate just short of the opposite end. Tube 10 is attached at the slotted end to base 1 by bolts 12 connected to the tube at one side of the slots, and by rods 13 riveted to the base and extending downwardly adjacent the inside of the opposite side of the tube and soldered thereto. Stator plates 15 are mounted inside the tube on rods 13 in position so that the rotor plates 4 can be interleaved therebetween when shaft 3 is rotated. Bearing 2 is connected to the side of tube 10 opposite the one on which the stator blades are mounted, by a three pronged springer washer 16, one prong of which rests on base 1.

The current path through the tube around the slots forms the desired inductance, shunted by the variable capacity formed by the rotor and stator plates. However, as it may be desirable to change the value of the inductance to maintain a high Q value in the circuit at significantly differing frequencies, we prefer to make the inductance variable. This is accomplished by threading the unslotted end of the tube 10 to a point well beyond the end of slots 11 and by rotating a threaded ring 17 on threads 18.

Figures 4, 6:
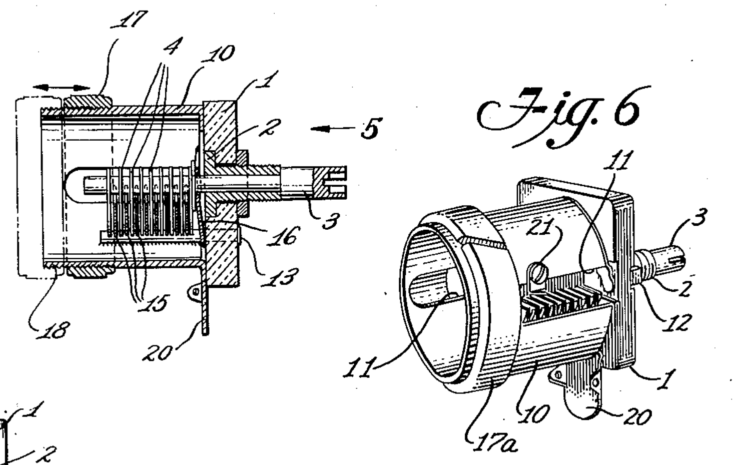
Figure 4 is a longitudinal sectional view of the unit of Figure 1.
Figure 6 is a perspective view of a tuned circuit unit utilizing a slidable slot shorting ring.
Figure 5:
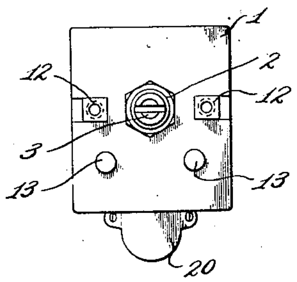
Figure 5 is a basal end view in elevation of the device of Figure 1.

As ring 17 is rotated and progressed toward base 7, the ring 17 will pass and cover the ends of slots 11, thus effectively decreasing the length of the path around the slots and thus decreasing the inductance of the tube. Thus, both a variation in capacity and in inductance is provided as best shown in Figure 4.

A trimming plate 20 is attached to tube 10 opposite the connection thereto of spring washer 16. A circuit connection 21 is made on one side of tube 10, between base 1 and ring 17. The position along the tube of the connection 21 may be varied in accordance with the type of vacuum tube and other elements that may be included in a circuit.

One unit of the type described capable of tuning from 60 m. c. s. to 320 m. c. s. comprised a brass tube three and one-fourth inches long, one and three-sixteenths inches inside diameter, slotted for three inches with slots one-half inch wide. The condenser was of 210 micro-micro-farad capacity. All metal parts of the tuned circuit were silver plated after assembly. Such a tuned circuit has been found highly satisfactory, particularly for ease of minor frequency adjustments.

The tuned circuit described is therefore ideally suited for aircraft radio or other mobile radio use where precision tuning, minimum size and weight, and sturdy construction are highly desirable.

It should also be pointed out that there may well be circuits in which a small precision variable inductance alone is to be used. In this case, the slotted pipe 10, tunable by turning the ring 17 on threads 18, may be used with advantage, without including the interiorly mounted variable capacity. In other instances a fixed interior capacity may be utilized, all tuning being done by turning ring 17.

For extreme accuracy of tuning a slidable split ring 17*a* may be used in place of the threaded ring 17, as shown in Figure 6. Here neither the slotted pipe 10 nor the ring 17*a* are threaded, but the split ring 17*a* is held in place by friction preferably with the split in the ring positioned away from either slot. The inner surface of the ring 17*a* closely fits the exterior surface of the pipe 10 and thus accurate shorting is provided by the edge of the ring 17*a* bridging the slots, when the ring is moved on the exterior surface of pipe 10.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While, in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

We claim:

1. A high frequency tuning device which comprises, in combination, a dielectric base member, a bearing sleeve centrally supported in said base member, an electrically conductive rotor shaft rotatable in said bearing sleeve and having a relatively long portion projecting from one end of said sleeve, a series of electrically conductive rotor plates each in the form of substantially half of a disc longitudinally spaced along the projecting portion of said shaft and secured thereon, a series of electrically conductive stator supporting rods circumferentially spaced on a circle concentric with said rotor shaft and having one end supported in said base, a hollow cylinder of electrically conductive material surrounding said rods and having diametrically opposite slots extending through the cylinder wall from one end to a point near the other, said cylinder being externally threaded from the shorted end partway of its length, a shorting bar in the form of an internally threaded collar of electrically conductive material on the threaded portion of said cylinder movable axially on said cylinder by rotation of said collar, a series of electrically conductive stator plates of approximately the form of the rotor plates and concentric therewith but having ears along their periphery whereby they are attached to said rods, said stator plates being longitudinally spaced on said rods between said rotor plates and circumferentially intermediate said cylinder slots.

2. The combination, in a high frequency tuning device of a hollow metal cylinder having diametrically opposite slots extending through the cylinder wall from one end to a point near the other, an adjustable shorting bar in the form of a metal collar surrounding said metal cylinder and movable axially on said metal cylinder, metal stator-plate-supporting means on the inside of said metal cylinder circumferentially intermediatie said slots, diametrically opposite metal stator plate assemblies secured to said metal stator-plate-supporting means, said assemblies each comprising a series of axially spaced metal stator plates each of approximately the form of a semi-disc, a metal rotor plate assembly comprising a series of metal rotor plates approximately of the shape of the stator plates spaced axially intermediate the stator plates, and means to concentrically support the rotor assembly within the stator assembly.

JOE D. FUNDERBURG.
BURTON P. HEINMILLER.

REFERENCES CITED

The following references are of record in the file of this patent:

UNITED STATES PATENTS

| Number | Name | Date |
|---|---|---|
| 2,085,223 | Kolster | June 29, 1937 |
| 2,251,631 | Mayer | Aug. 5, 1941 |
| 2,413,451 | Johnson | Dec. 31, 1946 |
| 2,457,816 | Grimm | Jan. 4, 1949 |
| 2,483,893 | Ecerett | Oct. 4, 1949 |